(No Model.)

H. L. HANSON.
STOVE POLISHING BRUSH.

No. 594,154. Patented Nov. 23, 1897.

Witnesses
L. W. Bradway.
Victor J. Evans.

Inventor
Harry L. Hanson.
By John Wedderburn
Attorney

UNITED STATES PATENT OFFICE.

HARRY L. HANSON, OF UNION MILLS, WISCONSIN, ASSIGNOR OF ONE-THIRD TO PATRICK P. EGAN, OF HIGHLAND, WISCONSIN.

STOVE-POLISHING BRUSH.

SPECIFICATION forming part of Letters Patent No. 594,154, dated November 23, 1897.

Application filed June 26, 1897. Serial No. 642,466. (No model.)

*To all whom it may concern:*

Be it known that I, HARRY L. HANSON, of Union Mills, in the county of Iowa and State of Wisconsin, have invented certain new and useful Improvements in Stove-Polishing Brushes; and I do hereby declare the following to be a full, clear, and exact description of the invention, such as will enable others skilled in the art to which it appertains to make and use the same.

The invention relates to an improved brush particularly designed for use in polishing stoves and similar surfaces, but which may be used for other purposes to which it may be found applicable.

It consists in the combination, with a suitable handle-frame, of a crank-shaft provided upon its ends with circular brushes, either of which may be used, said brushes being given a rotary movement by the movement of the double crank, upon the arms of which the brushes are mounted.

Figure 1:
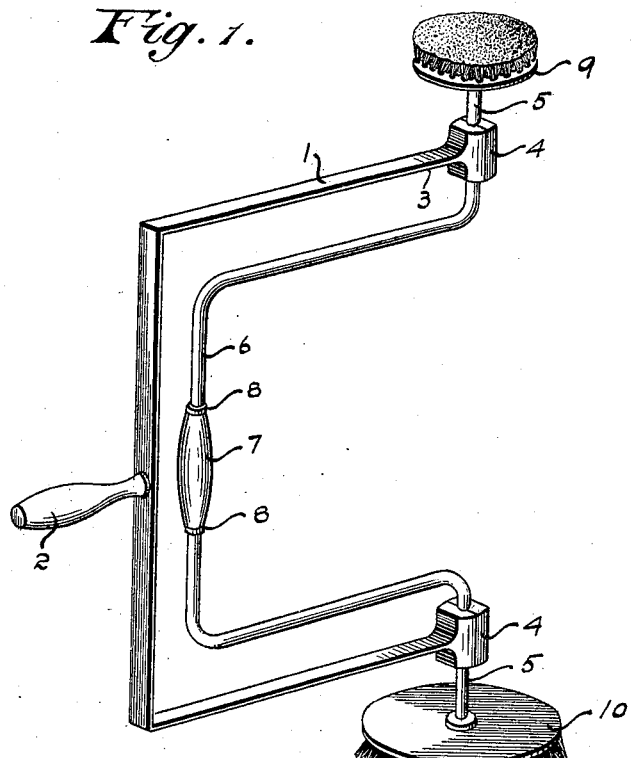
Figure 2:
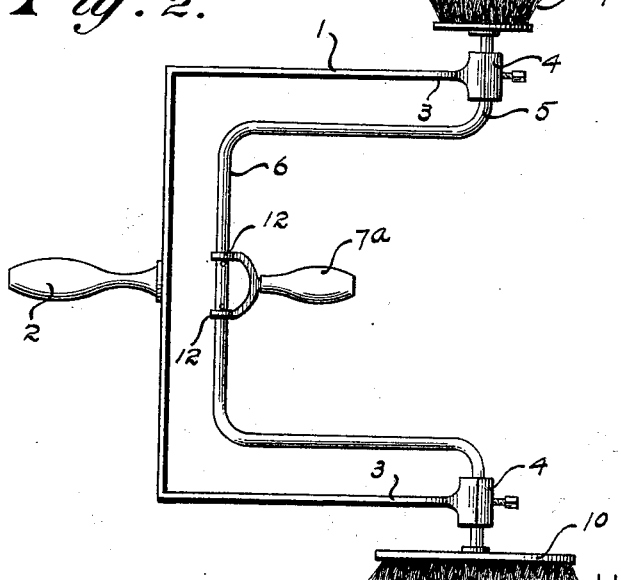

In the accompanying drawings, Figure 1 represents a perspective view of the improved brush; and Fig. 2, a side elevation of the same, showing a modification in the form of the handle for actuating the brush-crank.

1 indicates a U-shaped strap of iron, provided centrally of its loop end with a handle 2 and at the ends of its arms 3 with suitable bearings 4, in which is mounted a shaft 5, bent intermediate the arms 3 into the form of a double crank or loop 6. The shaft 5 with its crank portion 6 is made, preferably, from a single rod of round iron and is provided centrally of the loop or crank portion 6 with a handle-piece 7 free to rotate upon the crank portion 6 between suitable pins or collars (indicated at 8) through said crank portions, which hold the handle 7 in proper working relation to said crank portions. The ends of the shaft projecting beyond the bearings 4 in the handle-frame 1 thereof are provided with brushes 9 and 10 of different sizes and preferably of circular or disk form, the brush being upon the outer face of the disk or brush-back, which is rigidly secured to the ends of the shaft 5.

In Fig. 2 is shown a modification of the form of the handle, said handle being made to project from the crank portion 6 of the handle in a plane parallel with the handle 2, so that the handle 2 may be grasped in one hand and the handle 7ª in the other hand, the handle 7ª being provided with eyes at its inner end engaging the shaft 5 and allowing the latter to rotate freely in the eyes, (indicated at 12.) This last-described arrangement is preferred, as it removes all liability of the hand operating the crank 6 coming into contact with the handle-frame 1, though the latter may be enlarged sufficiently to obviate any danger of contact of the hand therewith.

By the construction described it will be seen that while the handle-frame is held by the handle 2 with the shaft 5 at right angles to the surface to be operated upon by the brush 9 or 10 the shaft can be rapidly rotated by means of the handle 7 or 7ª and removed from contact with the brush, thereby obviating the blacking of the hands, so annoying in the ordinary process of blacking or polishing stoves. The shaft 5 can be passed through the eye-bearings in the handle-frame 1 prior to being bent into the crank form indicated and also prior to having the brush attached to its ends, or the eye-bearings for the shaft may be formed in part upon the strap or bearing frame 1 and the latter provided at the ends with suitable perforated ears to which the half-bearing cap-piece engaging the shaft therein may be secured by means of screws in the usual manner.

Any suitable construction of brush may be employed, and the device as a whole will be found to be simple and effective in operation and one which will be free from the usual annoyance attendant upon the use of stove-polishing brushes.

Having thus described the invention, what I claim as new, and desire to secure by Letters Patent, is—

1. In a stove-polishing brush, the U-shaped handle-frame provided in the ends of its arms with bearings for the brush-shaft, in combination with a revoluble shaft carrying brushes upon its ends and provided intermediate the arms of the handle-frame with a double crank for actuating it, substantially as described.

2. The U-shaped handle-frame provided with a handle in its loop end and with bearings in the ends of its arms for the brush-shaft, in combination with the brush-shaft mounted in said ends and provided intermediate its bearings therein with a crank portion, a swiveling handle mounted on said crank portion, and a brush secured to the end of said shaft, substantially as described.

In testimony whereof I have signed this specification in the presence of two subscribing witnesses.

HARRY L. HANSON.

Witnesses:
RICHARD EGAN,
JNO. H. WALL.